(12) United States Patent
Anderson et al.

(10) Patent No.: US 8,857,632 B2
(45) Date of Patent: Oct. 14, 2014

(54) JERSEY HANGER ASSEMBLY AND JERSEY DISPLAY

(75) Inventors: Joseph W. Anderson, St. Louis, MO (US); Daniel G. Sprague, St. Louis, MO (US)

(73) Assignee: Big Time Jersey, LLC, St. Louis, MO (US)

( * ) Notice: Subject to any disclaimer, the term of this patent is extended or adjusted under 35 U.S.C. 154(b) by 229 days.

(21) Appl. No.: 13/265,796

(22) PCT Filed: Apr. 22, 2010

(86) PCT No.: PCT/US2010/032058
§ 371 (c)(1),
(2), (4) Date: Oct. 21, 2011

(87) PCT Pub. No.: WO2010/124094
PCT Pub. Date: Oct. 28, 2010

(65) Prior Publication Data
US 2012/0037581 A1 Feb. 16, 2012

Related U.S. Application Data

(60) Provisional application No. 61/172,018, filed on Apr. 23, 2009.

(51) Int. Cl.
A47F 7/00 (2006.01)
A47F 7/22 (2006.01)
A47H 1/02 (2006.01)
A41H 5/00 (2006.01)

(52) U.S. Cl.
CPC ........................................ A47F 7/22 (2013.01)
USPC .......................... 211/85.3; 211/105.1; 223/68

(58) Field of Classification Search
USPC ............... 211/87.01, 100, 85.3, 105.1, 105.2, 211/105.3, 105.4; 40/218, 607.1, 607.01; 116/173, 28 R; 223/66, 85, 120, 92, 84, 223/72
See application file for complete search history.

(56) References Cited

U.S. PATENT DOCUMENTS 724,118 A 3/1903 Mulkerins
1,188,921 A * 6/1916 Finkelstein ..................... 223/90
(Continued)

FOREIGN PATENT DOCUMENTS

GB 749878 A 6/1956

OTHER PUBLICATIONS

International Search Report and Written Opinion for PCT/US2010/032058 dated Jul. 8, 2010 (16 pages).

*Primary Examiner* — Jonathan Liu
*Assistant Examiner* — Patrick Hawn
(74) *Attorney, Agent, or Firm* — Polsinelli PC

(57) ABSTRACT

A jersey hanger assembly is described. The jersey hanger assembly allows homes, businesses, schools, or other buildings to display an athletic jersey as a symbol of team pride or of support for an athletic team or an individual player on the team. The jersey hanger assembly includes a bracket member. The bracket member includes a receiving member. The jersey hanger assembly includes a pole with first and second opposing ends. The second pole end is insertable into the receiving member. The pole has a curved shape between the first and second opposing ends. A jersey flag for hanging on the jersey hanger is described. The jersey flag is material of a fabric cut or shaped to resemble an athletic jersey. The material includes a team logo or insignia. A sleeve or an open seam in positioned in the upper portion of the jersey flag to receive the pole.

20 Claims, 15 Drawing Sheets

(56) References Cited

U.S. PATENT DOCUMENTS

| | | | |
|---|---|---|---|
| 1,342,346 A | 6/1920 | Murtha | |
| 2,137,691 A * | 11/1938 | Landsman | 223/69 |
| 2,707,070 A * | 4/1955 | Tanzer | 223/68 |
| 3,145,849 A * | 8/1964 | Hanson | 211/105.1 |
| 4,079,840 A | 3/1978 | Usner | |
| 4,140,163 A | 2/1979 | Usner | |
| 4,431,108 A | 2/1984 | Lee | |
| 4,590,883 A | 5/1986 | Steed et al. | |
| 4,830,203 A * | 5/1989 | Ennis | 211/105.2 |
| 4,996,752 A * | 3/1991 | Clendinen | 24/464 |
| 5,059,057 A | 10/1991 | Graef | |
| 5,329,873 A | 7/1994 | Tiballi | |
| 5,377,849 A * | 1/1995 | Martin | 211/85.7 |
| 5,495,821 A | 3/1996 | Brewer | |
| 5,702,010 A * | 12/1997 | Liang | 211/105.1 |
| 6,073,642 A * | 6/2000 | Huang | 135/114 |
| 6,287,042 B1 * | 9/2001 | Eriksson | 403/267 |
| 7,325,696 B2 | 2/2008 | Matthew et al. | |
| 7,832,569 B1 * | 11/2010 | Nemenz | 211/85.3 |
| 8,146,784 B1 * | 4/2012 | Calanca et al. | 223/94 |
| 2002/0011502 A1 | 1/2002 | Preyss | |
| 2002/0153337 A1 * | 10/2002 | Shuen | 211/123 |
| 2004/0068888 A1 * | 4/2004 | Lurie | 34/90 |
| 2004/0256338 A1 * | 12/2004 | McGarry et al. | 211/94.01 |
| 2005/0204579 A1 * | 9/2005 | Rosseau et al. | 34/104 |
| 2011/0036794 A1 * | 2/2011 | Schott | 211/85.3 |
| 2011/0290683 A1 * | 12/2011 | High et al. | 206/315.7 |

* cited by examiner

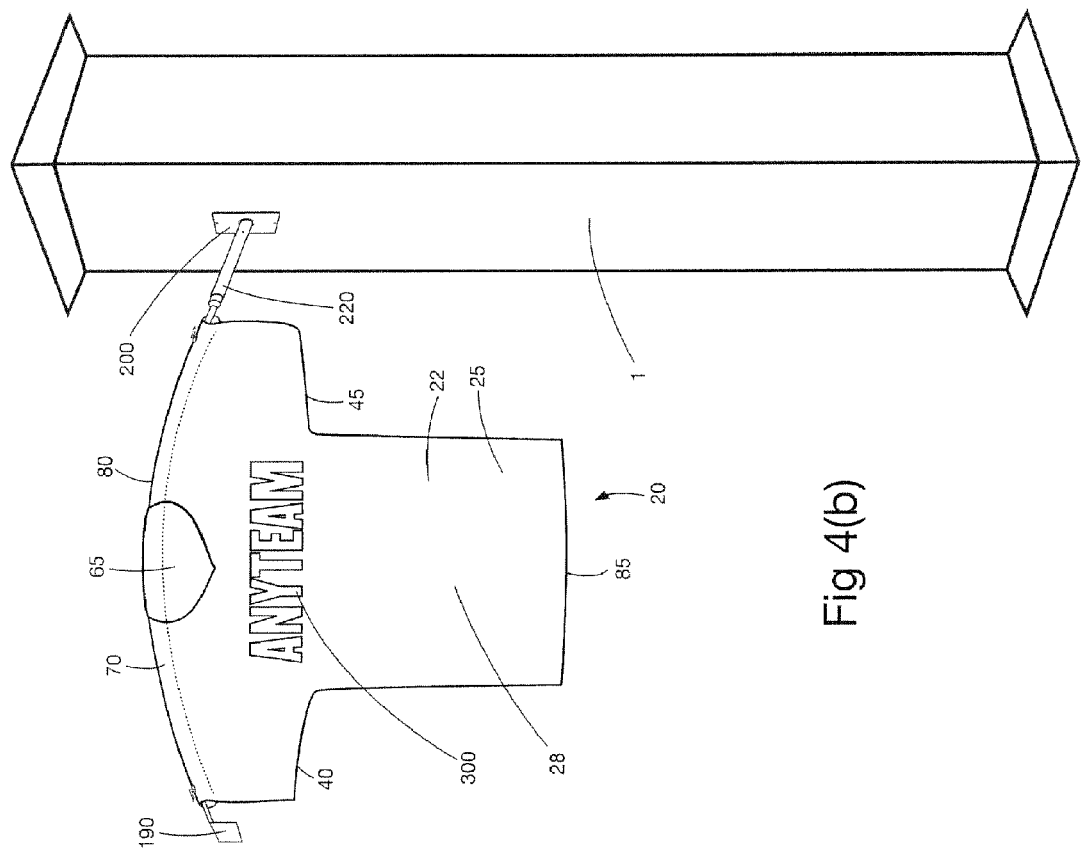
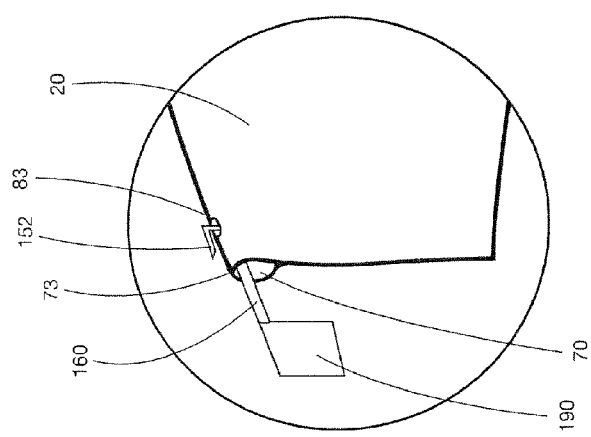
Fig 4(b)
Fig 4(a)

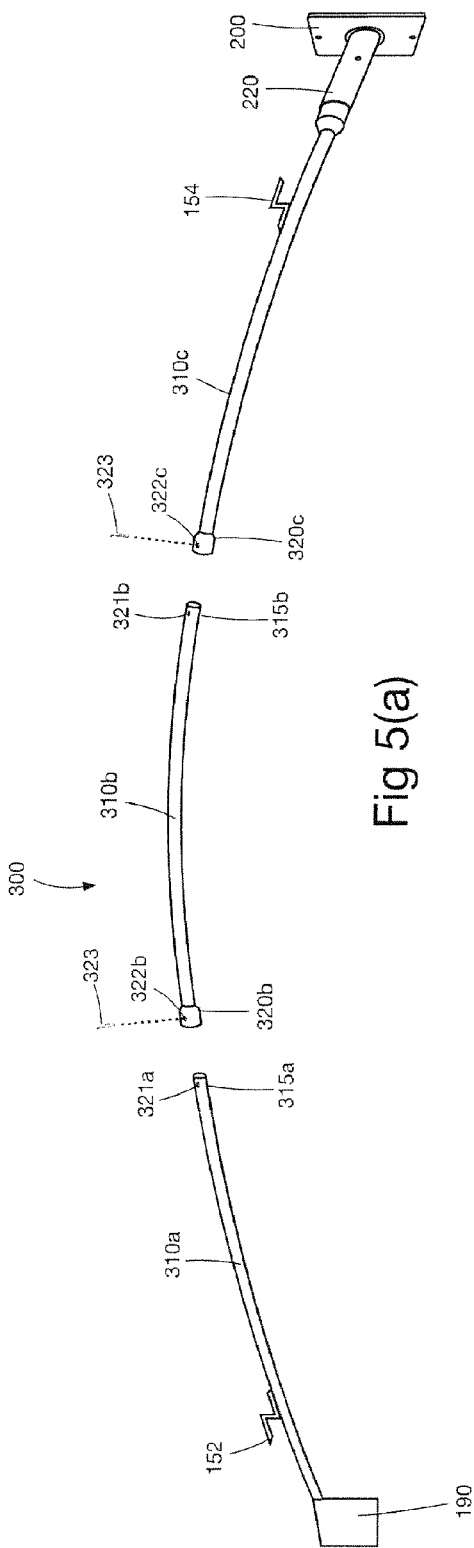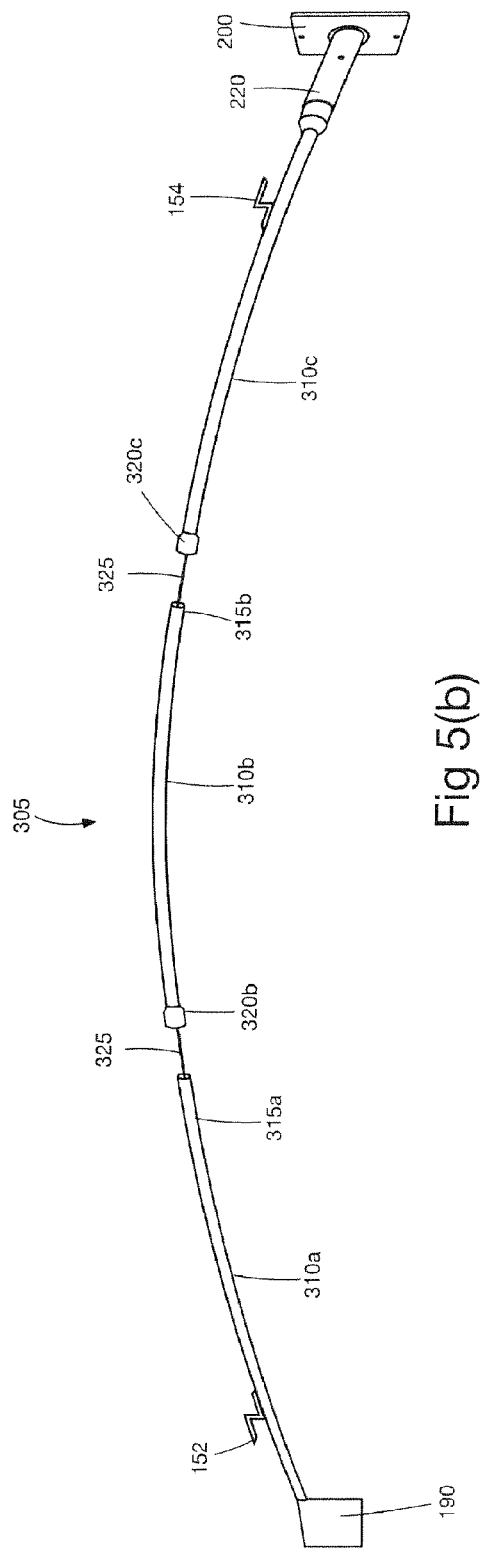

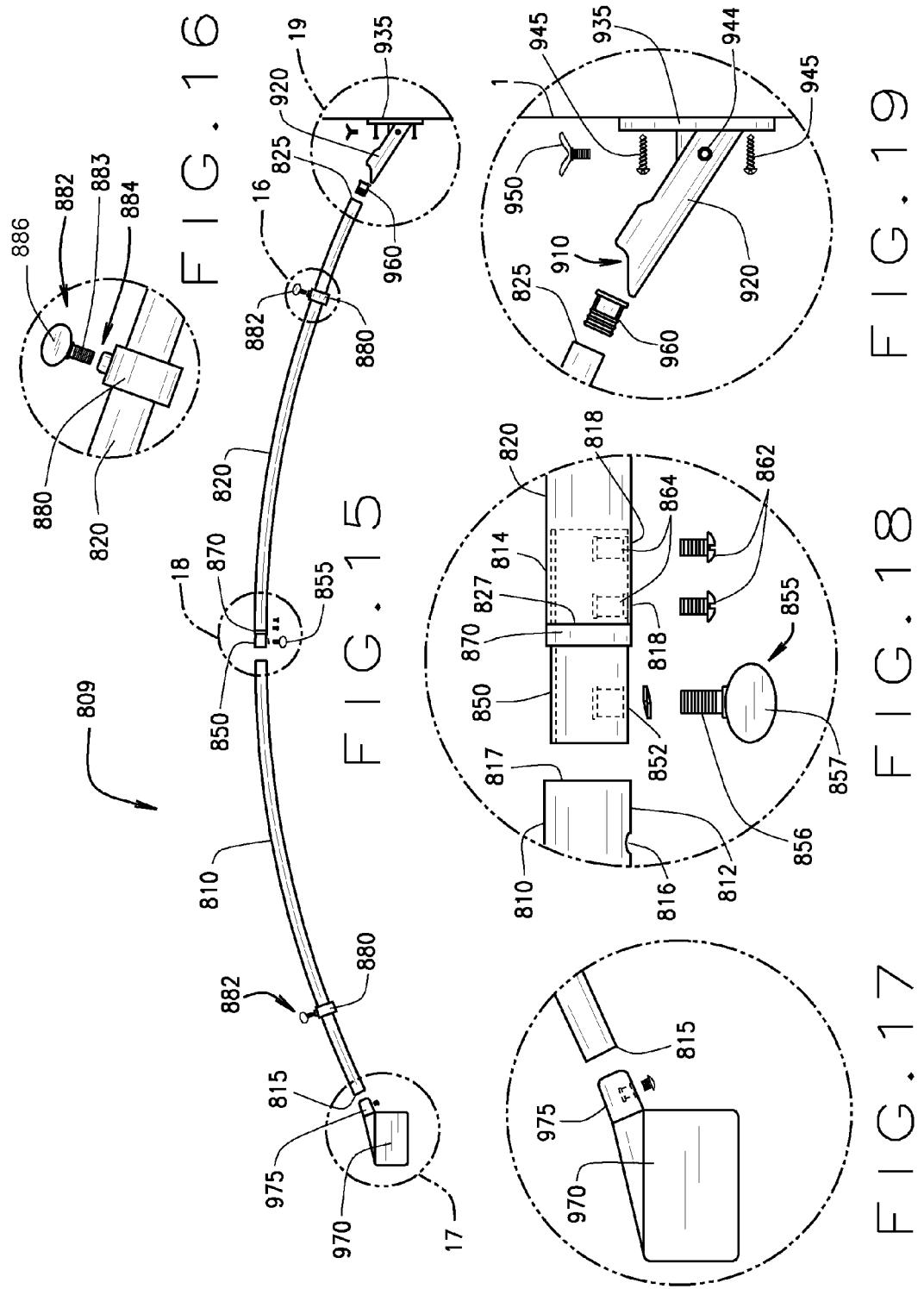

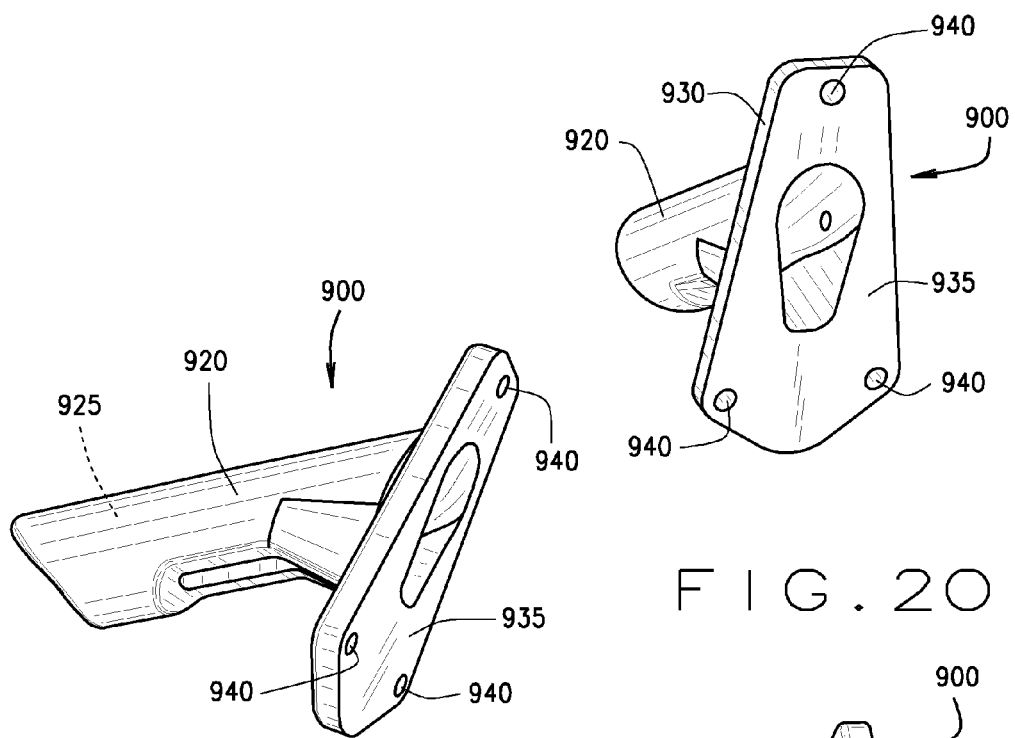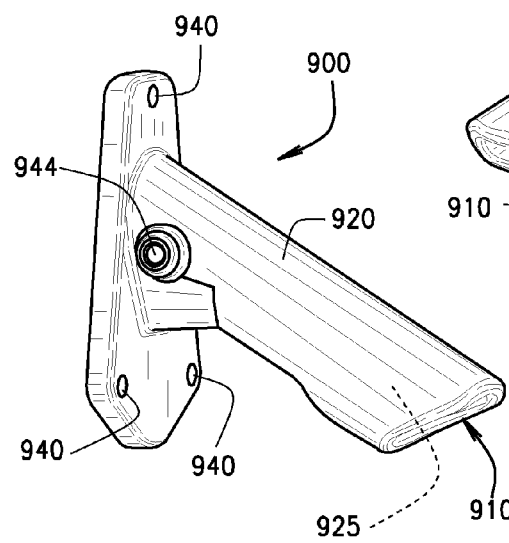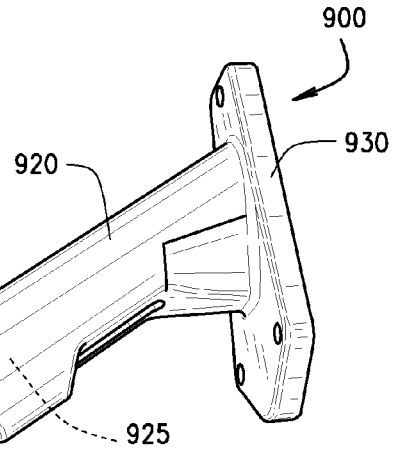

JERSEY HANGER ASSEMBLY AND JERSEY DISPLAY

FIELD OF THE INVENTION

The present invention relates to a jersey hanger assembly for displaying a jersey.

SUMMARY OF INVENTION

A jersey hanger assembly is described herein. The jersey hanger assembly may be used to hang and display a jersey, such as, an actual jersey, a mock jersey, a replica jersey, or a jersey flag on the hanger assembly. The jerseys may include a jersey for baseball, football, basketball, hockey, soccer, etc.

The jersey hanger assembly allows homes, businesses, schools, or other buildings to display an athletic jersey as a symbol of team pride or of support for the team or an individual player on the team. Parents or athletes may order a jersey customized to their team, their name, and their player's number. The jersey hanger and jerseys are well suited for fund-raising activities.

The jerseys are removably positioned on the hanger assembly, such that the jerseys may be replaced on the hanger assembly depending upon the season or time of the year. For example, a baseball jersey may be hung on the hanger assembly in the spring and summer, while a football jersey may be hung on the hanger assembly in the fall or winter.

The hanger assembly may be used to display jerseys from professional and collegiate sports teams, as well as jerseys from local teams, such as, little league, middle school, high school, community organized, parochial, or other select athletic and club teams. The jersey may include a team name and emblem/logo on a front surface of the jersey with an individual player name may be placed on a rear surface of the jersey. Of course, the jerseys may also just include a generic team logo or other design on only one surface of the jersey.

The hanger assembly includes a pole and a mounting bracket. The pole has a curved shape to provide for a realistic display of the jersey. The pole fits into the mounting bracket. The mounting bracket may be fixedly attached to a building, a pole, or other structure.

The hanger assembly may be fixedly attached to the structure in an orientation that provides for the front surface and the rear surface of the jersey to be visible. Other embodiments mount the jersey to hang in a flush position relative to the structure. The hanger assembly is suitable for both indoor and outdoor use.

Although the hanger assembly is capable of displaying an actual athletic jersey, the hanger assembly is especially adapted to display a mock, a replica jersey, or a jersey flag as described herein. The mock, replica, and jersey flag may include a sleeve or open seam along its top surface to receive the pole of the hanger assembly. The sleeve has a diameter a little larger than the diameter of the pole, such that the pole slides into the sleeve or the open seam.

In other embodiments, the pole removably attaches to loops, gaps, or other means of the jersey that receive the pole.

In one aspect, a jersey hanger assembly is described. The jersey hanger assembly includes a bracket member, which comprises a receiving member. The jersey hanger assembly includes a pole with first and second opposing ends. The second pole end is insertable into the receiving member. The pole has a curved shape between the first and second opposing ends.

In another aspect, a jersey hanger assembly is described. The jersey hanger assembly includes a bracket member, a receiving member integral to and extending from the bracket member, and an opening in the receiving member. The jersey hanger assembly includes a pole having a curved shape. The pole has first and second opposing ends. The second end of the pole has an external surface smaller than the opening. The second end of the pole is insertable into the opening of the receiving member.

In another aspect, a jersey display is described. The jersey display includes a jersey hanger assembly. The jersey hanger assembly includes a bracket member and a pole with first and second opposing ends. The pole has a curved shape. The jersey display further includes a jersey flag including material of a fabric configured to resemble an athletic jersey, and a sleeve or an open seam in an upper portion of the jersey flag. The sleeve or open seam of the jersey flag receives the pole.

In another aspect, a jersey flag for hanging on a jersey hanger is described. The jersey flag includes material of a fabric cut or shaped to resemble an athletic jersey. The material includes a team logo or insignia. The jersey flag includes a sleeve or an open seam in an upper portion of the jersey flag to receive a pole.

In another aspect, a jersey hanger assembly for mounting to a receiver of a vehicle is described. The jersey hanger assembly includes a pole with first and second opposing ends. The second pole end connects to or inserts into a receiving member. The jersey hanger assembly further includes a vertical member. A first end of the vertical member connects to the receiving member. The jersey hanger assembly further includes a vehicle receiver plug, and a second end of the vertical member extends from the vehicle receiver plug.

In another aspect, a jersey hanger assembly for hanging a jersey flush to a structure is described. The jersey hanger assembly includes a pole with first and second opposing ends to receive a jersey, a bracket to mount on a structure, and a pole connection member extending from the bracket to attach to an approximate middle portion of the pole. The pole connection member includes a curve or bend of approximately 85° to approximately 95°, wherein the curve or bend of the pole connection member is positioned between the bracket and the pole.

In another aspect, a jersey hanger assembly for attaching to an over-hanging structure is described. The jersey hanger assembly includes a pole with first and second opposing ends to receive a jersey. The second pole end connects or inserts into a receiving member. The jersey hanger assembly further includes a vertical member. A first end of the vertical member connects to a bracket member. The bracket member is configured to attach to an overhanging structure. A second end of the vertical member connects to the receiving member. The jersey hanger assembly hangs below where the bracket member attaches to the over-hanging structure.

In another aspect, a jersey hanger assembly is described. The jersey hanger assembly includes a bracket member, which includes a receiving member. The jersey hanger assembly further includes a pole including two or more pole sections that are connected or attached together to form the pole. The pole has first and second ends. The second pole end is insertable into the receiving member. The pole has a curved shape between the first and second opposing ends.

In another aspect, a jersey display is described. The jersey display includes a bracket member, which includes a receiving member. The jersey display includes a pole including two or more pole sections that are connected or attached together to form the pole. The pole has first and second ends. The second pole end is insertable into the receiving member. The pole has a curved shape between the first and second opposing ends. A jersey is hung or mounted to the pole.

In another aspect, a pole for displaying or hanging a jersey is described. The pole includes two or more pole sections that are connected or attached together to form the pole. The pole has first and second ends. Mounting members attach or tighten against the pole and hold a jersey to the pole.

In another aspect, a method of assembling a jersey display is provided. The method includes providing a first pole section, a second pole section, and a connector. The method includes attaching or connecting the first pole section to the connector, and attaching or connecting the second pole section to the connector. The method further includes providing a jersey, and inserting an end of the pole through the jersey.

In another aspect, a method of assembling a jersey hanger assembly is described. The method includes providing a bracket member, the bracket member comprising a receiving member. The method further includes providing a pole with first and second opposing ends, and the pole having a curved shape between the first and second opposing ends. The method further includes inserting the second pole end into the receiving member.

BRIEF DESCRIPTION OF DRAWINGS

FIG. 4(a) is a close-up view of the jersey flag on the hanger assembly at the flattened portion.
FIG. 4(b) is a view of the jersey flag on the hanger assembly with the mounting bracket secured to the structure.
FIG. 5(a) is a view of the multi-piece pole embodiment of the jersey hanger.
FIG. 5(b) is a view of another multi-piece pole embodiment of the jersey hanger, wherein the pole sections include the elastic member.
FIG. 15 is an exploded view of the pole.
FIG. 16 is a detailed view of the ring.
FIG. 17 is a detailed view of the end cap.
FIG. 18 is a detailed view of the connector and pole sections.
FIG. 19 is a detailed view of the pole and bracket.
FIG. 20 is a rear view of the bracket.
FIG. 21 is a side, rear view of the bracket.
FIG. 22 is a side, front view of the bracket.
FIG. 23 is a side, front view of the bracket.

DETAILED DESCRIPTION OF EMBODIMENTS

Figure 1:
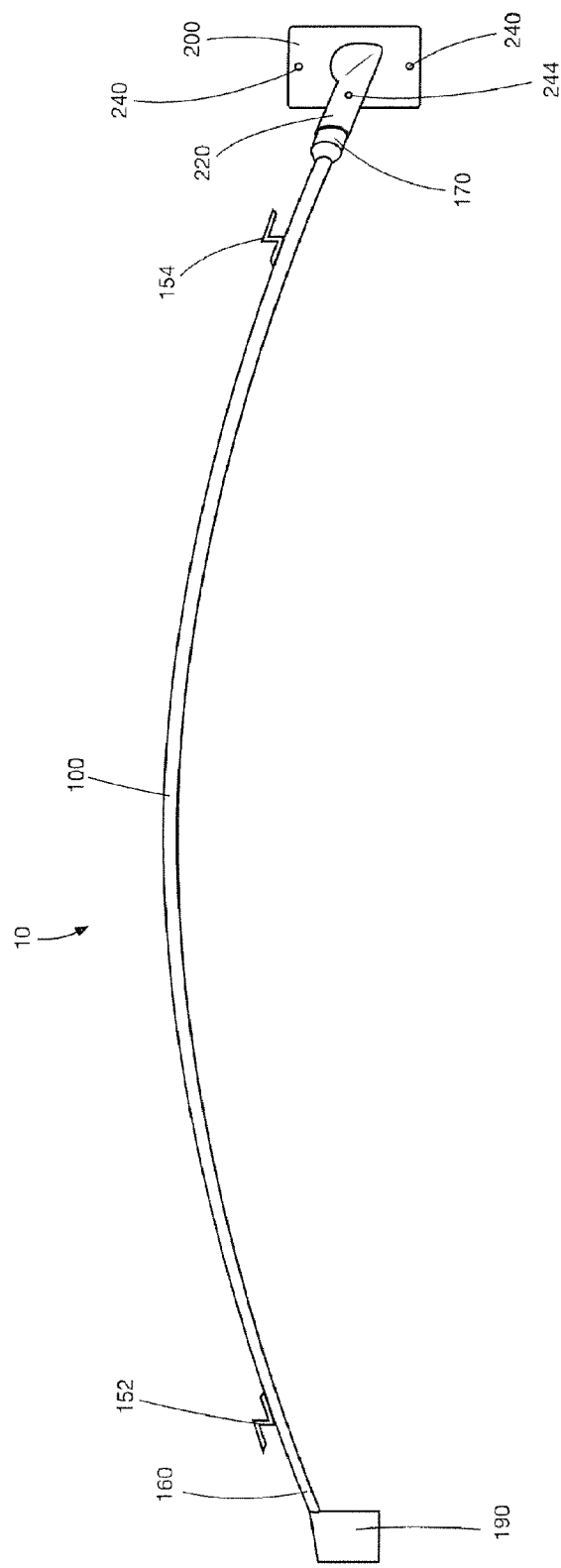
FIG. 1 is a view of hanger assembly.

The jersey hanger will now be described with reference to FIGS. 1-4. A hanger assembly 10 is shown in FIG. 1. The hanger assembly 10 comprises a pole 100 that is inserted into a mounting bracket 200.

As used herein, the term "jersey" includes actual jerseys, mock jerseys, replica jerseys, and jersey flags. The jersey flag is a flag shaped to appear like a jersey. The jersey flag generally has a two-dimensional structure, while an actual jersey generally has a three-dimensional structure. The jersey flag generally is not cut or shaped to include a hollow internal portion that would normally fit over a wearer's body or hollow sleeves to fit over the wearer's arms. As such, the jersey flag would not typically be worn by an individual. The jersey flag may be produced from conventional materials used for flags that are die-cut to appear like a jersey. Arm and a neck portions may be cut from the material or layers of materials.

Figures 2A, 2B:
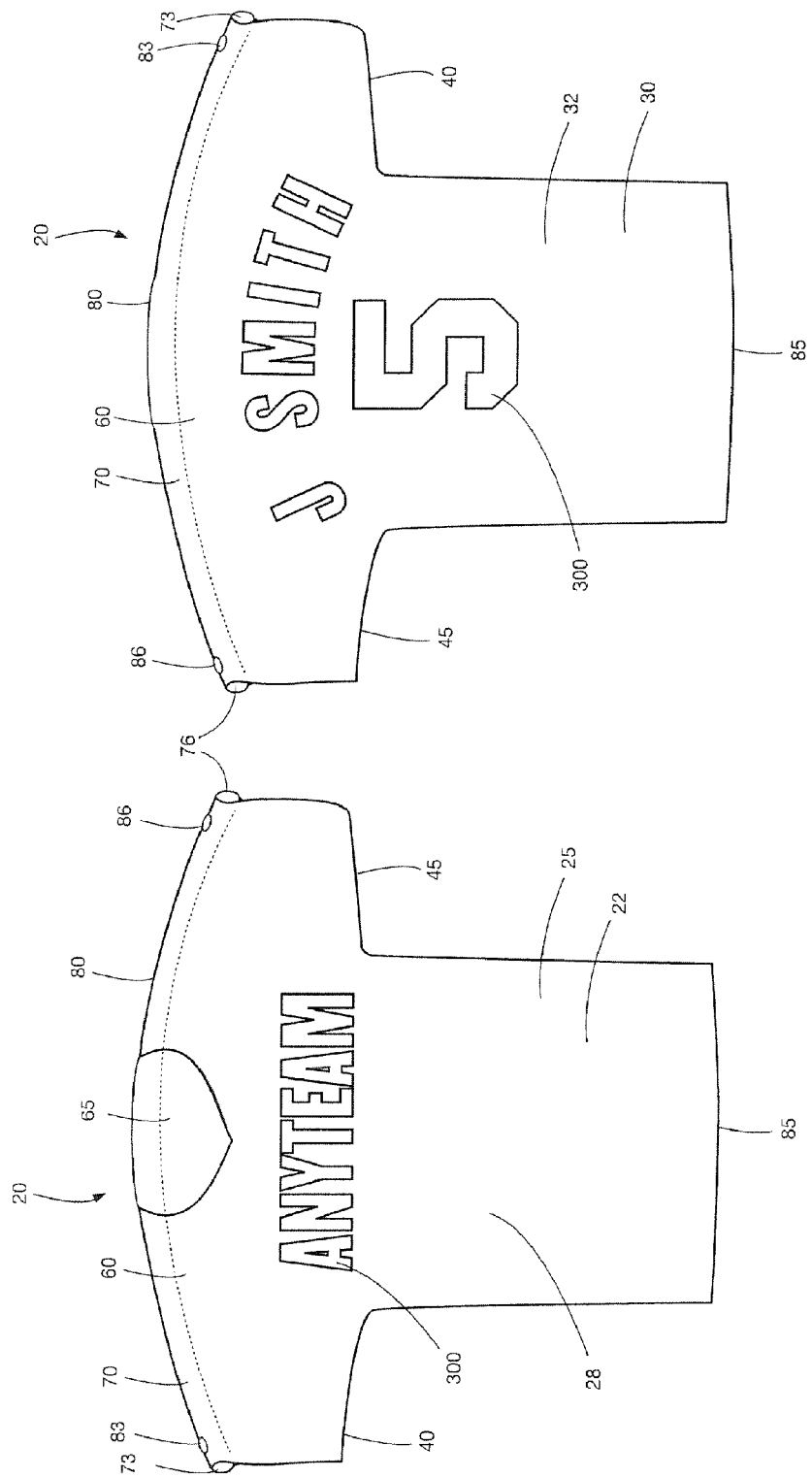
FIG. 2(a) is a front view of the jersey flag.
FIG. 2(b) is a rear view of the jersey flag.

A jersey flag 20 is shown in FIGS. 2(a) and 2(b). The jersey flag 20 includes a front portion 25 and a rear portion 30. The jersey flag 20 is shaped like an actual, athletic jersey. The jersey flag 20 further includes a first arm portion 40 and a second arm portion 45. A top portion 60 of the jersey flag 20 includes a neck portion 65, which simulates the head opening of an actual athletic jersey. The neck portion 65 may include a cut-out region of a first layer 22 of jersey material that is sewn over or attached to a second layer 32 of jersey material. The first layer 22 forms the front portion 25, while the second layer 32 forms the rear portion 30.

The top portion 60 further includes a sleeve 70 that extends between the first arm portion 40 and the second arm portion 45 along a top surface 80 of the jersey flag 20. The sleeve 70 defines an open passage to receive the pole 100. The sleeve 70 may also be formed as an open seam between the first layer 22 and the second layer 32. The sleeve 70 includes a first opening 73 and a second opening 76. The first opening 73 and the second opening 76 slideably receive the pole 100 to thread the pole 100 through the seam 70 in order to hang the jersey flag 20 on the pole 100.

The pole 100 includes a first pole end 160 and a second pole end 170 at opposite ends of the pole 100. The pole 100 slides through connecting portions of the jersey flag 20, which, in this embodiment, is formed by the sleeve 70.

Figure 3:
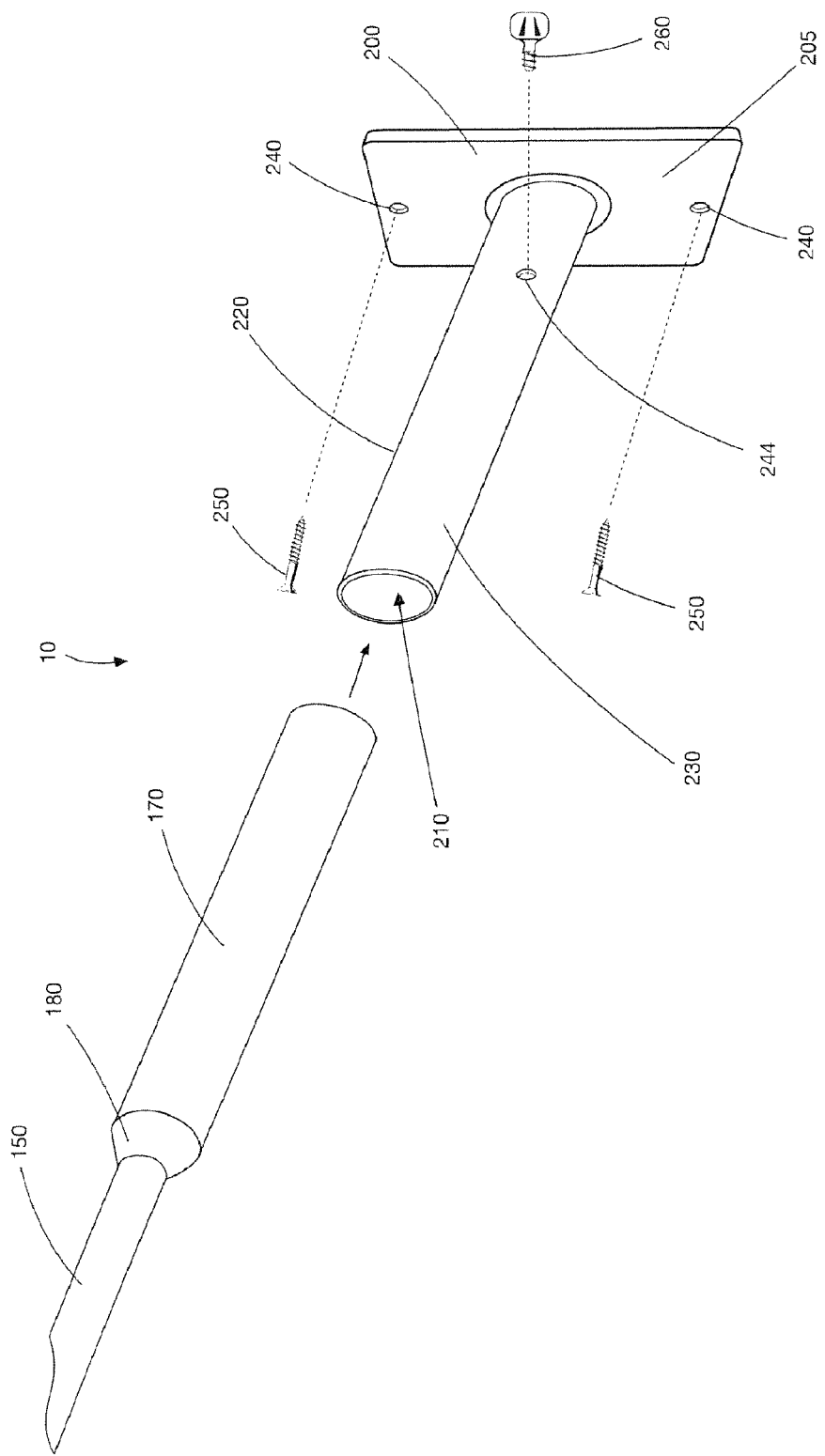
FIG. 3 is a view of the bracket member receiving the second pole end.

The connection of the pole 100 to the mounting bracket 200 will now be described with reference to FIG. 3. The second pole end 170 is inserted into an opening 210 of a receiving member 220. The receiving member 220 is integral to and extends from the mounting bracket 200. The opening 210 leads into a cavity 230 of the receiving member 220 that receives the second pole end 170. The second pole end 170 has a diameter slightly less than the opening 210 and the cavity 230, such that the second pole end 170 will fit or snugly fit into the cavity 230. The cavity 230 should have a sufficient depth to receive and cover at least several inches of the second pole end 170 in order to provide stability to secure the pole 100 to the mounting bracket 200.

The mounting bracket 200 includes a generally flat base surface 205. The base surface 205 includes openings 240 therethrough that receive fasteners 250 to attach the mounting bracket 200 to a house, wall, pole, or other structure 1. The fasteners 250 may include nails, screws, bolts, rivets, and other known in the art fastener devices. In other embodiments, the openings 240 may be omitted and an epoxy or adhesive may be used to attach the mounting bracket 200 to the structure 1.

The receiving member 220 includes an optional opening 244. A holding member 260 is inserted into the opening 244 to further secure the second pole end 170 into the cavity 230. The holding member 260 may include a screw or other fastener that is removably fastened into the opening 244, such as by threads internal to the opening 244. By installing the holding member 260, the pole 100 is further secured to the receiving member 220.

The pole 100 includes a transition region 180 that expands in diameter to form the second pole end 170. The second pole end 170 is of a larger diameter than a majority of the pole 100 in order to provide a structurally sufficient connection between the pole 100 and the receiving member 220.

With particular reference to FIG. 4(a), the first pole end 160 further includes a flattened portion 190. The flattened portion 190 provides space for additional branding for the manufacturer and/or distributor of the hanger assembly 10. Stickers or adhesives related to the athletic team or the player may also be applied thereto. The flattened portion 190 further provides an additional structure to prevent the jersey flag 20 from sliding off of the pole 100, as the overall shape of the flattened portion may provide a physical stop that does not pass or does not easily pass through the sleeve 70.

The pole 100 has an overall length of approximately 50 inches to approximately 110 inches, with certain embodiments having an overall length of approximately 75 inches to approximately 85 inches. Overall length, as defined herein, is the horizontal separation between the first pole end 160 and second pole end 170. One of ordinary skill in the art will recognize that these dimensions may be scaled up or down depending upon the application of the hanger assembly 10.

The pole 100 typically has a curved shape in which the first pole end 160 and the second pole end 170 are aligned at about the same vertical height. Suitable curved shapes for the pole 100 include, but are not limited to, a circular arc, an elliptical arc, a parabola, a catenary, and a sine wave. The pole 100 is formed to have this generally curved shape to impart a more realistic appearance to the jersey flag 20 when hung from the pole 100. Because of the curved shape of the pole 100, a center segment of the pole 100 located midway between the first pole end 160 and the second pole end 170 typically is situated in a higher vertical position than either the first pole end 160 or the second pole end 170. In one embodiment, the difference in vertical height of the center segment of the pole 100 relative to the first pole end 160 and second pole end 170 is a distance ranging between about 1% and about 40% of the overall length of the pole 100, with certain embodiments having a difference in vertical height ranging between about 10% and about 20% of the overall length of the pole 100. In another embodiment, the difference in vertical height of the center segment of the pole 100 relative to the first pole end 160 and second pole end 170 is a distance ranging between about 1 inch and about 40 inches, with certain embodiments having a difference in vertical height ranging between about 5 inches and about 15 inches. One of ordinary skill in the art will recognize that these dimensions may be scaled up or down depending upon the application of the hanger assembly 10.

In one exemplary embodiment, the pole 100 may have a curved shape that is a circular arc. The circular arc may range in shape from about a 10° circular arc to about a 180° circular arc (e.g., a half-circle) shape. The radius of curvature defining the circular arc shape of the pole 100 ranges from about 25 inches to about 400 inches, depending on shape of the circular arc and the desired overall length of the pole 100. In this embodiment, the difference in vertical height of the center segment of the pole 100 relative to the first pole end 160 and the second pole end 170 ranges between about 1 inch and about 45 inches. One of ordinary skill in the art will recognize that these dimensions may be scaled up or down depending upon the application of the hanger assembly 10.

The pole 100 has a cross-sectional shape that may be a geometric shape including, but not limited to, circular, square, triangular, elliptical, teardrop-shaped and hexagonal. The cross-section of the pole 100 may be a solid cross-section, or the cross section may include an outer wall enclosing a hollow inner section. The cross-section of the pole 100 may be a composite cross-section in which an outer wall constructed of a first material encloses a second material in the interior region of the cross-section.

The pole 100 has a maximum cross-sectional dimension of approximately ¼ inch to approximately 1½ inches. Embodiments with the pole 100 having an approximately ⅝ inch maximum cross-sectional dimension are suitable. The specific maximum cross-sectional dimension will depend upon the materials used for the pole 100. One of ordinary skill in the art will recognize that these dimensions may be scaled up or down depending upon the application of the hanger assembly 10.

In one embodiment, the maximum cross-sectional dimension of the pole 100 may remain constant along the length of the pole 100. In another embodiment, the maximum cross-sectional dimension of the pole 100 may vary along the length of the pole 100. For example, the pole 100 may have a higher maximum cross-sectional dimension near the second pole end 170 that tapers to a smaller maximum cross-sectional dimension near the first pole end 160. In yet other embodiment, the cross-sectional diameter of the pole 100 may remain the same along the length of the pole 100, but the thickness of the walls making up the cross-section of the pole 100 may gradually decrease from a maximum thickness near the second pole end 170 to a minimum thickness near the first pole end 160. One of ordinary skill in the art will recognize that these dimensions may be scaled up or down depending upon the application of the hanger assembly 10.

With reference to FIGS. 2(a) and 2(b), the top surface 80 of the jersey flag 20 further includes a first positioning opening 83 and a second positioning opening 86. The first positioning opening 83 and the second positioning opening 86 are in open communication with the open interior of the sleeve 70. With reference to FIG. 1, positioning members 152 and 154 on the pole 100 engage the first positioning opening 83 and the second positioning opening 86. With reference to FIG. 4(a), the positioning members 152 and 154 include a hook or other holding structure that engage the opening 83 and the opening 86. The positioning members 152 and 154 help prevent the jersey flag 20 from sliding off of the pole 100. Additional positioning members 152 and 154 may further be positioned on the other portions of the pole 100.

The flattened portion 190 may be threadably received by a threaded portion of the first pole end 160. As such, the flattened portion 190 may be temporarily removed from the pole 100 in order to facilitate the hanging of the jersey flag 20 onto the pole 100. In other embodiments, the flattened portion 190 is integral or permanently connected to the first pole end 160, and the flattened portion 190 has a size that may be urged through the sleeve 70.

Graphics 300 may be placed on the jersey flag 20. As shown in FIGS. 2(a) and 2(b), the graphics 300 are on the chest portion 28 of the jersey flag 20. Of course, the jersey flag 20 may include the graphics 300 in any position or location.

The jersey flag 20 is made from a fabric material that replicates an actual athletic jersey in appearance. The jersey flag 20 may include a weather-resistant, 100% nylon material, other synthetic materials, or other synthetic blend materials. The jersey flag 20 may be constructed of two-ply nylon using heavy-duty stitching or adhesives. The two-ply nylon allows graphics 300 to be placed on and be seen on both sides of the jersey flag 20 without showing through to the opposite side.

The jersey flag 20 has a width from an exterior of the first arm portion 40 to an exterior of the second arm portion 45 of approximately 30 inches to approximately 90 inches with certain embodiments having an approximate 65 inch width. The jersey flag 20 has a height from the top surface 80 to the bottom surface 85 of approximately 35 inches to approximately 75 inches with certain embodiments having an approximately 55 inch height. One of ordinary skill in the art will recognize that these dimensions may be scaled up or down depending upon the application of the jersey flag 20.

The bracket 200 and the pole 100 may be constructed out of plastics, synthetic materials, metals, such as aluminum or stainless steel, etc., graphite, wood, or other composite materials. The pole 100 may be made of a different material from the mounting bracket 200.

The jersey flag 20 may be formed from a die-cutting process or other suitable methods for constructing the jersey flag 20. The graphics 300 may be applied through conventional, known in the art techniques.

Although the embodiment described in FIGS. 1-4 has the pole 100 that is inserted into the mounting bracket 200, in other embodiments, the pole 100 and the mounting bracket 200 may be a one-piece or unitary member.

In other embodiments, the jersey flag 20 and hanger assembly 10 are scaled-up for oversized versions suitable for display in athletic stadiums, on large buildings and parking garages, and hung from other elevated structures, such as light posts. The jersey flag 20 may have a length and width of approximately 10 feet to approximately 40 feet.

In other embodiments, such as shown in FIGS. 5(a) and 5(b), the pole 100 comprises two or more pole sections that are connected together to form the pole 100. As shown in FIGS. 5(a) and 5(b), a first multi-piece pole 300 and a second multi-piece pole 305 includes pole sections 310a, 310b, and 310c. The pole sections 310a-c may be assembled together to form the multi-piece poles 300 and 305. This multi-piece assembly of the poles 300 and 305 may provide a product with a reduced packaging size.

The pole sections 310a-c are removably connected to each other. The pole section 310a includes a male end 315a that is received by a female end 320b of the pole section 310b. Opposite of the female end 320b, the pole section 310b includes a male end 315b that is received by a female end 320c of the pole section 310c. In these embodiments, the female ends 320b and 320c include a hollow internal diameter to receive the male ends 315a and 315b.

After insertion of the male ends 315a and 315b into the female ends 320b and 320c, the multi-piece pole 300 includes openings 321a and 321b in the male ends 315a and 315b that receive fasteners 323 passing through openings 322b and 322c of the female ends 320b and 320c. The fasteners 323 provide extra structural durability to the pole 300. The fasteners 323 may include screws, bolts, nuts, cotter pins, and other known in the art fasteners.

The multi-piece pole 305 includes a stretching/elastic material permanently affixed between the male ends 315a, 315b and the female ends 320b, 320c, respectively. Elastic members 325 urge the pole sections 310a-c together, but allow the pole sections 310a-c to be pulled apart and collapsed for reduced packaging size and storage convenience.

Figure 6:
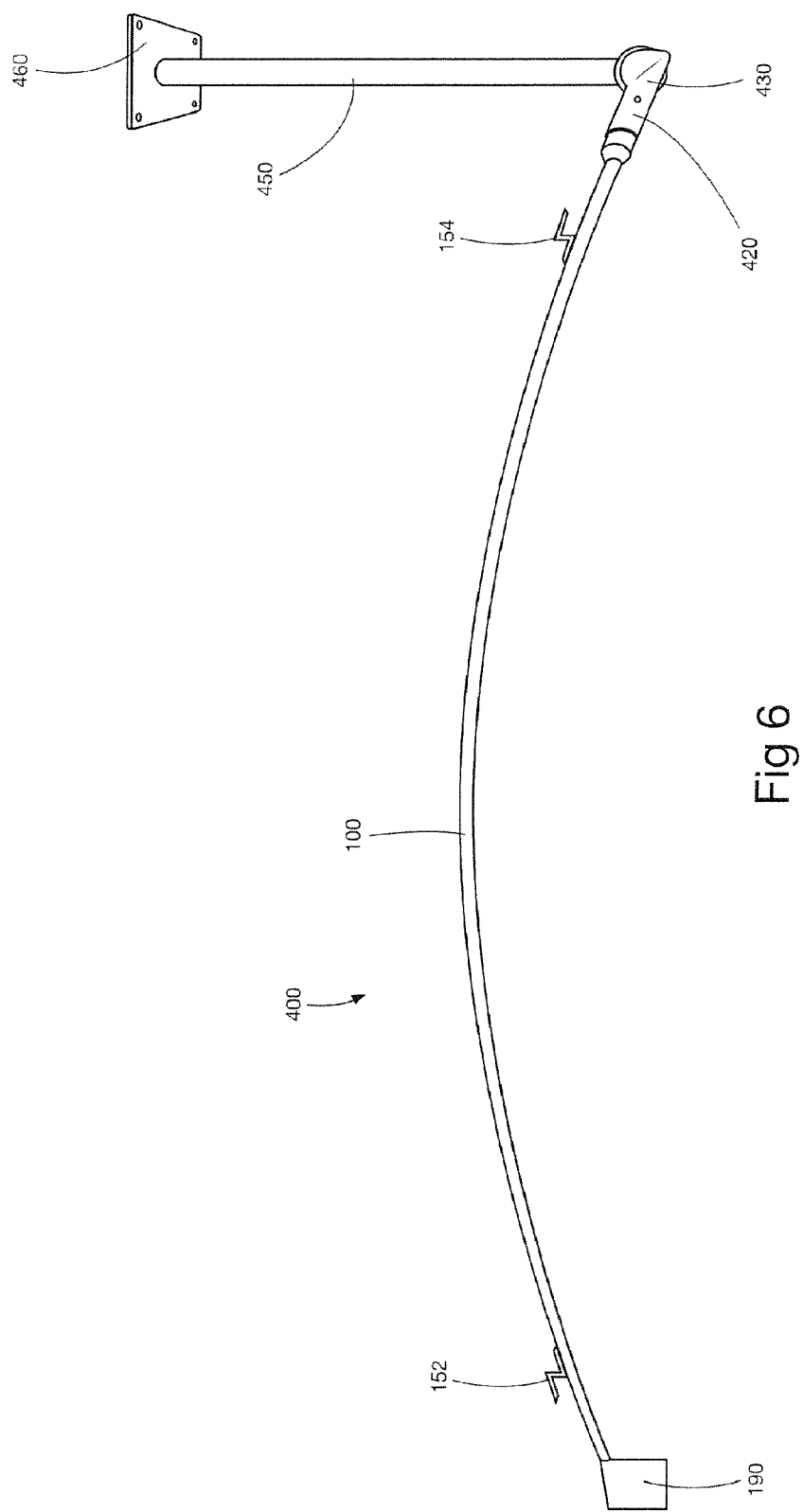
FIG. 6 is a view of the ceiling-hung embodiment of the jersey hanger.

FIG. 6 is a view of a ceiling-hung jersey hanger 400. The pole 100 connects to a receiving member 420 that connects or joins to a curved transition member 430, which further connects or joins to a vertical member 450. The receiving member 420 is angled at approximately 20° to approximately 70° relative to the vertical member 450.

A bracket 460 is mounted to a ceiling to position the ceiling hung jersey hanger 400. The vertical member 450 attaches to or is integral with the bracket 460. The vertical member 450 may have a length of less than 12 inches for placement of the jersey flag 20 close to the ceiling. The vertical member 450 may have a length of several feet or more for placement of the jersey flag 20 well below the ceiling. The vertical member 450 generally extends below the ceiling in generally perpendicular direction. Although the ceiling is mentioned for attachment of the ceiling-hung jersey hanger 400, the jersey hanger 400 may also be hung from a bottom of an eave, a bottom of a deck, a balcony, or any other over-hanging structure.

Figure 7:
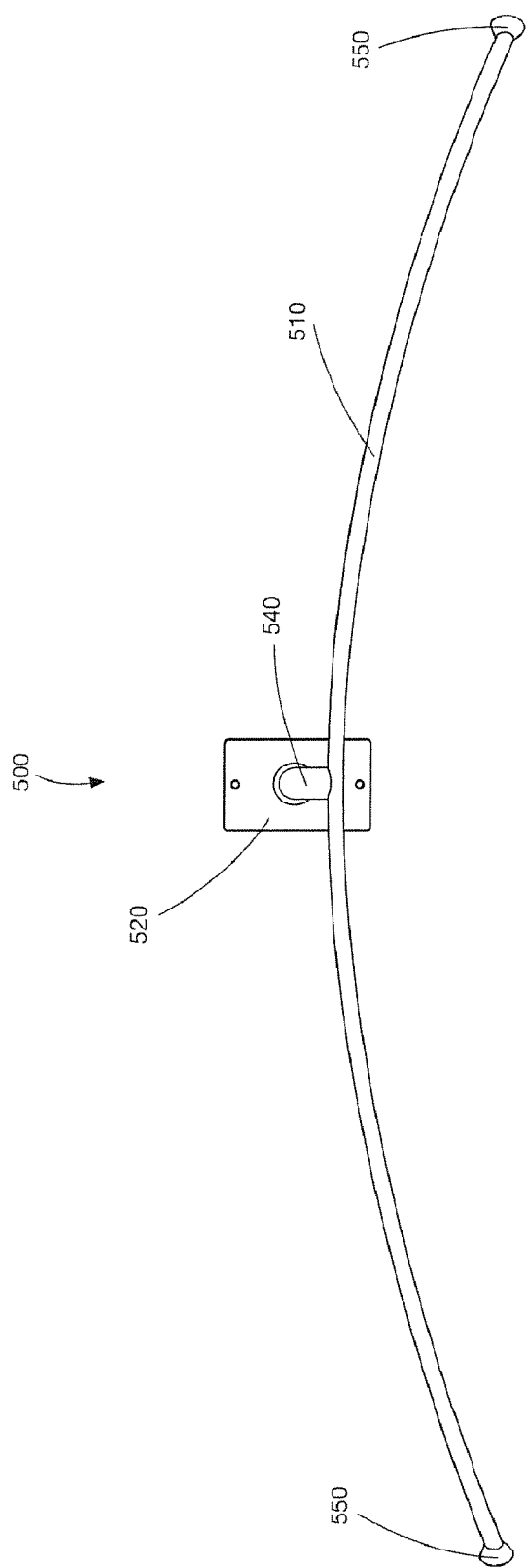
FIG. 7 is a view of the parallel-hung embodiment of the jersey hanger.

FIG. 7 is a view of the parallel-hung embodiment 500 of the jersey hanger. The parallel-hung embodiment is suited for hanging an actual jersey, although the flag jersey 20 may be hung therefrom. The parallel-hung embodiment 500 generally mounts parallel or flush to a mounting structure. A bracket 520 is mounted to the mounting structure. A pole connection member 540 extends from the bracket 520. The pole connection member 540 includes a curve or bend of approximately 85° to approximately 95° before it connects to a pole 510 at an approximate middle portion of the pole 510. The pole connection member 540 removably connects to the pole 510. The pole 510 includes rounded ends 550.

Figure 8:
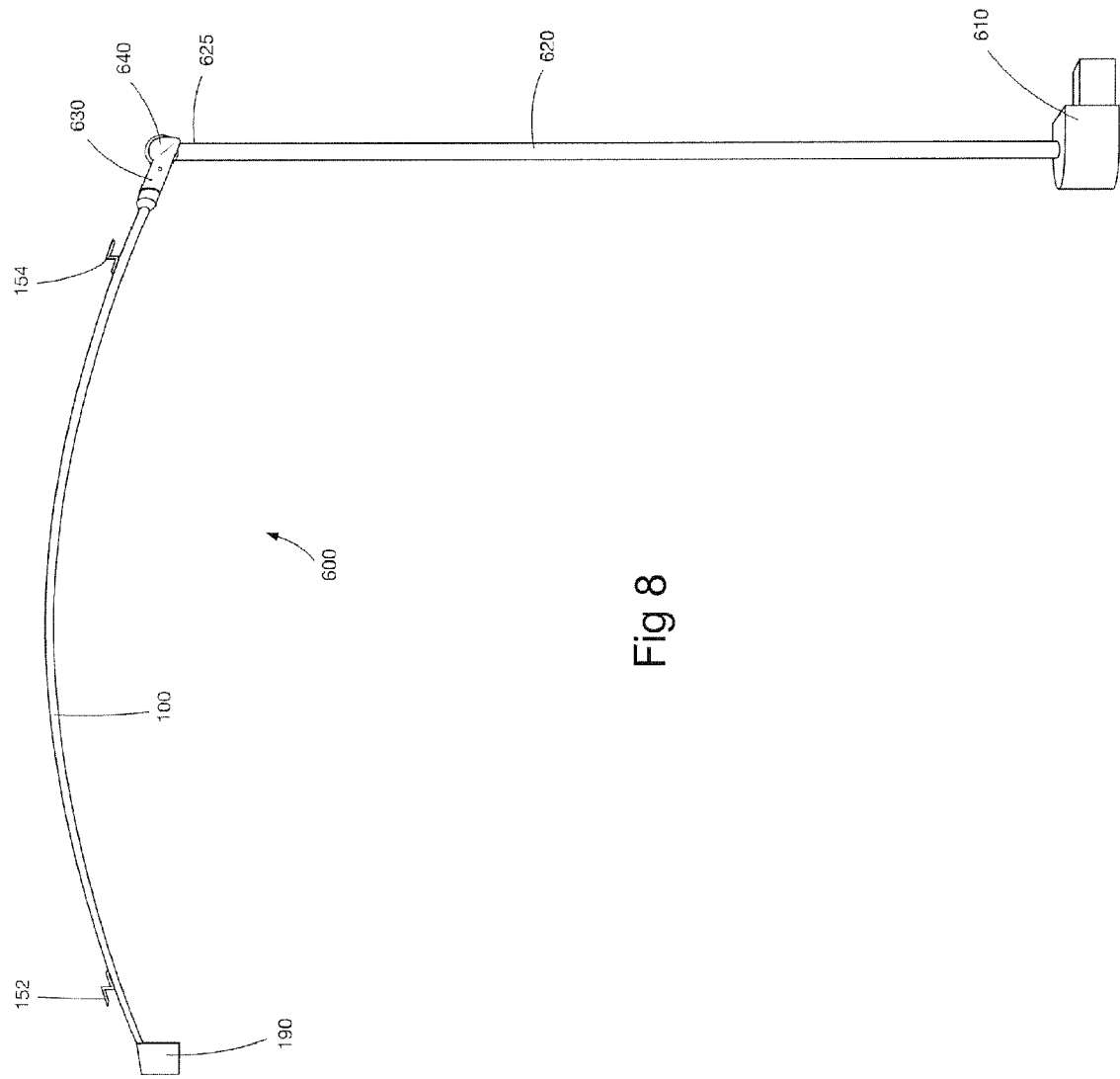
FIG. 8 is a view of the vehicle receiver mounted embodiment of the jersey hanger.

FIG. 8 is a view of the vehicle receiver mounted embodiment 600 of the jersey hanger. The vehicle receiver mounted embodiment 600 connects to a receiver of a vehicle to, for example, display the jersey flag 20 at a tail-gate party or at a sporting event. The vehicle receiver mounted embodiment 600 includes a vertical member 620 that extends in an upward direction from a receiver plug 610 that is inserted into the receiver of the vehicle. The vertical member 620 may have a length of approximately 6 to 20 feet, depending up the size of the jersey flag 20 and the preferences of the user. A top portion 625 of the vertical member 620 connects or is integral with a receiving member 630 that receive the pole 100. The receiving member 630 includes a curve or bend 640 of approximately 85° to approximately 95° before it connects to the vertical member 620.

The receiving member 630 is connected to the vertical member 620 at angle of approximately 110° to approximately 160° relative to the vertical member 620. These range of angles cooperate with the curve of the pole 100 to provide for an even hanging of the jersey flag 20.

Figure 9:
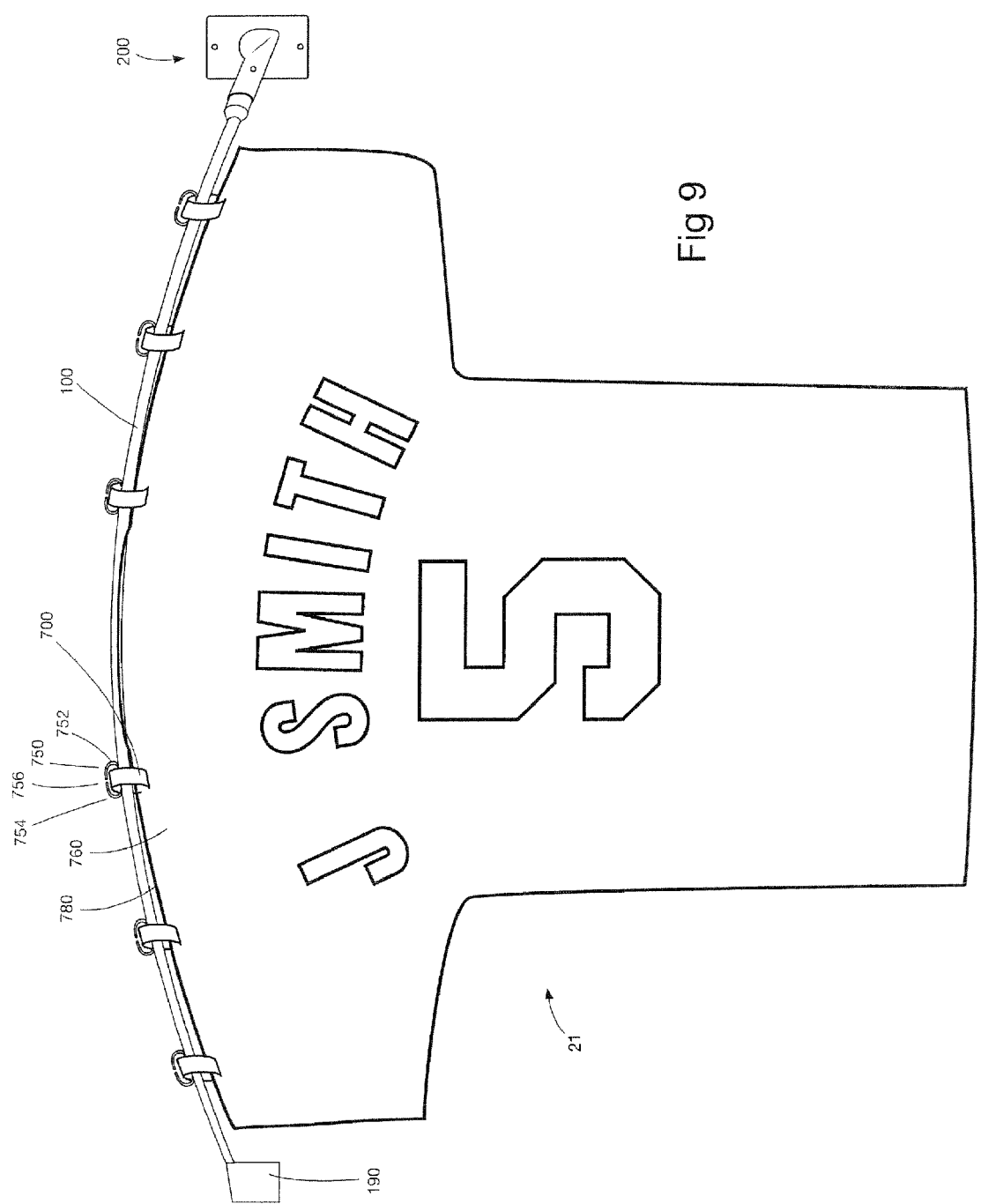
FIG. 9 is a view of the jersey with loops for connecting to the pole.

FIG. 9 is a view of a jersey flag 21 with loops 700 for connecting to the pole 100. The jersey flag 21 includes two or more of the loops 700 extending from a top surface 760, a top portion 780, or top-rear portion of the jersey flag 21. The loops 700 engage the pole 100 to position the jersey flag 21 on the pole 100.

The incorporation of several loops 700 along the length of the pole 100 maintains the positioning of the jersey flag 21 on the pole 100, as the jersey flag 21 does not bunch-up or slide to one side or the other of the pole 100. The loops 700 may be sewn or attached, such as by adhesives, to the jersey flag 21. The loops 700 may also pass through holes or openings in the jersey flag 21.

The loops 700 include an open portion that engages a positioner member 750 attached or integral to the pole 100.

The positioner member 750 includes opposing sides 752 and 754. A void 756 is formed between the opposing sides 752 and 754 to receive the loops 700. The void 756 provides for the loops 700 to be removably positioned on the pole 100, as the loops 700 may be alternatingly placed in or removed from the positioner member 750 by sliding the loops 700 through the void 756 and into a space between the opposing sides 752 and 754.

The loops 700 may be made of the same or different material as the jersey flag 21. During assembly, the pole 100 is inserted or threaded through the loops 700. The positioner members 750 of the pole 100 should be of size to permit adjacent loops 700 to slide over a top of the positioner member 750 until the corresponding positioner member 750 is located right above the corresponding loop 700. A rounded, top surface of the positioner member 750 is suited for this type of assembly.

In other embodiments, such as shown in FIGS. 10-27, a multi-piece pole 800 comprises two or more pole sections that are connected or attached together to form the multi-piece pole 800. A jersey flag 805 is positioned or hung from the multi-piece pole 800 to form a jersey display 808.

Figure 10:
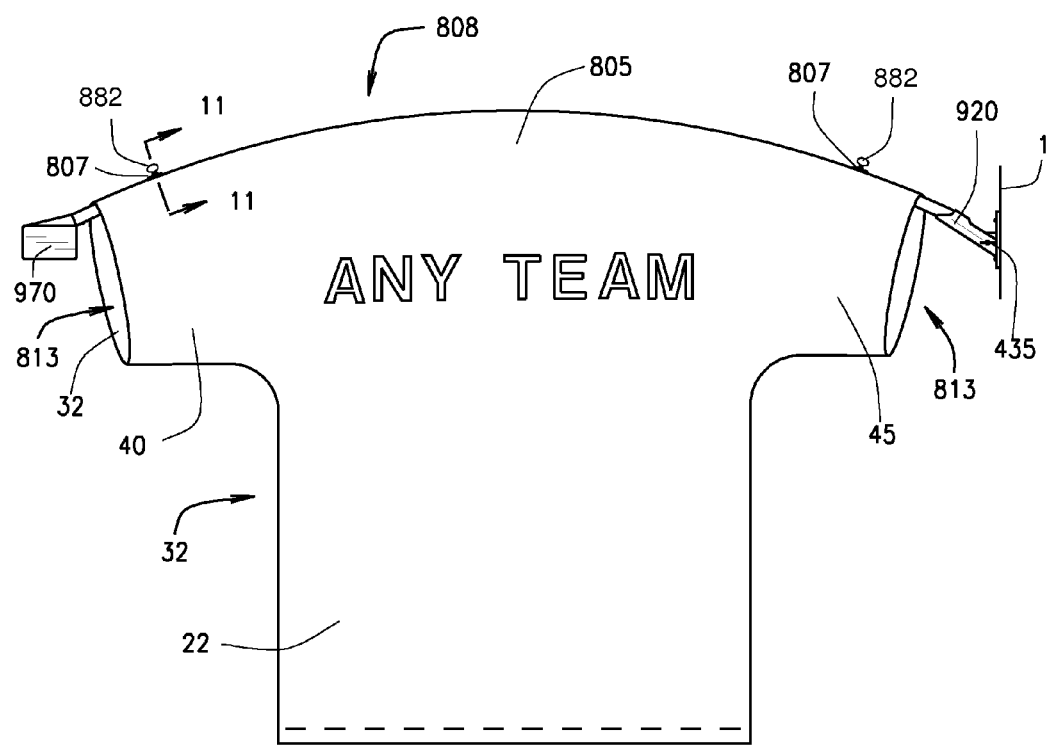
FIG. 10 is a view of the hanger assembly and the jersey flag.
Figure 11:
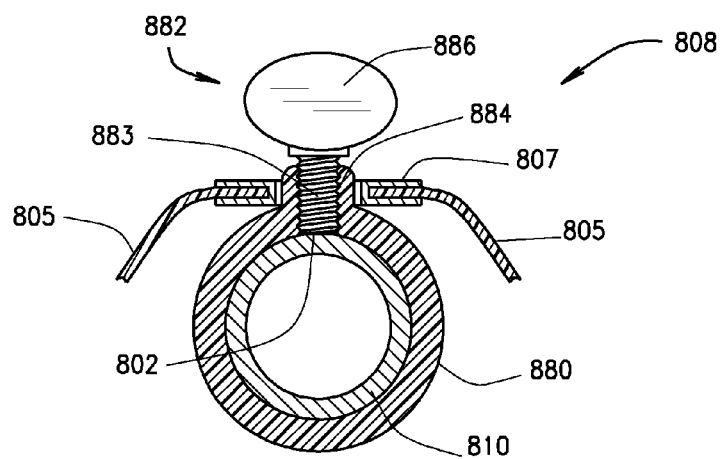
FIG. 11 is a cross-sectional view of the jersey flag attaching to the pole.

The jersey flag 805 may be similar to the other jersey flags described herein. The multi-piece pole 800 may pass through the sleeve 70 formed between the first layer 22 of jersey material and the second layer 32, as shown in FIGS. 2(A) and 2(B), in order to hang and/or display the jersey flag 805. The multi-piece pole 800 may also pass through an opening 813 defined by the first arm portion 40 and the second arm portion 45, as shown in FIG. 10.

Figures 12, 13, 14:
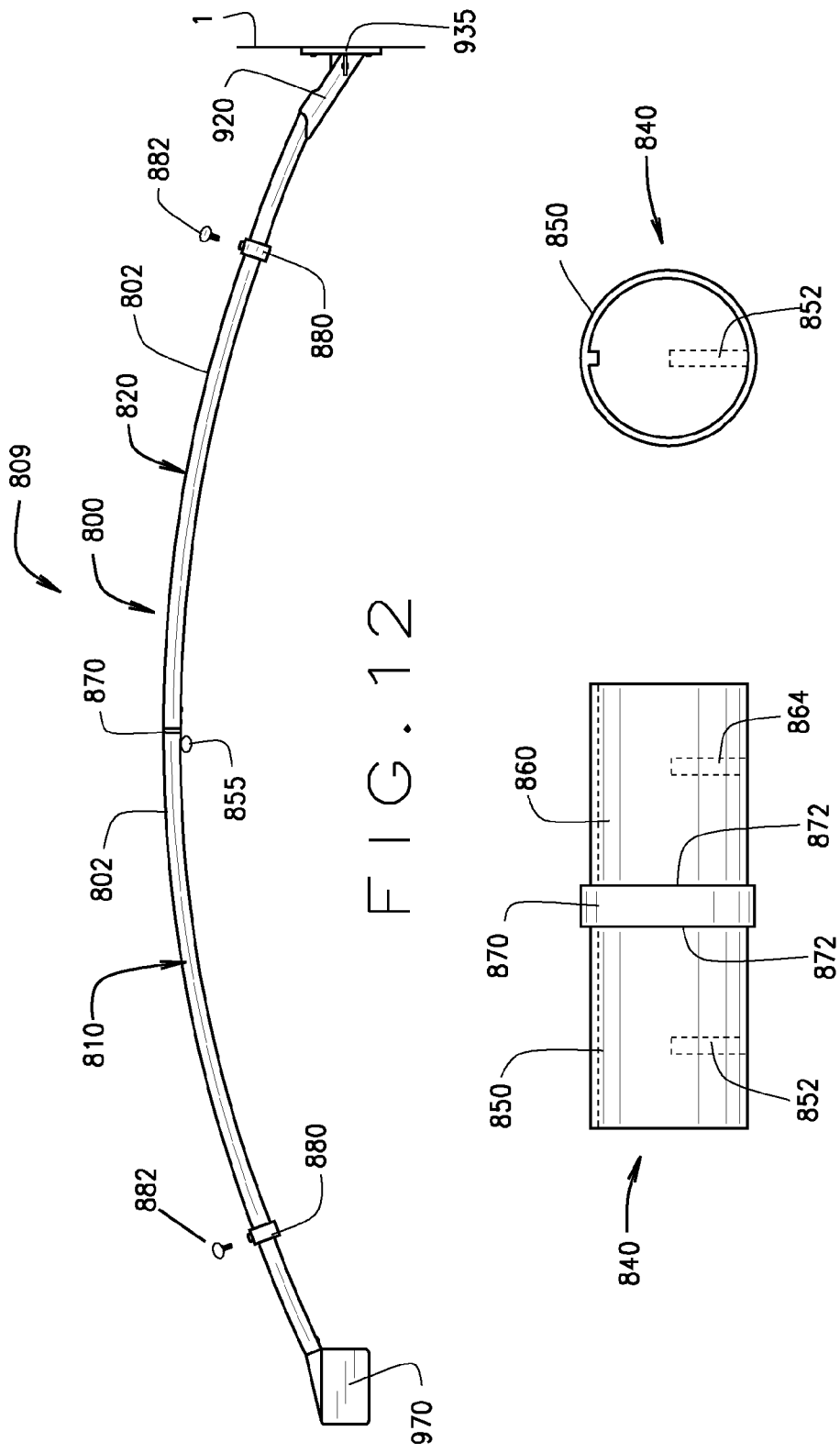
FIG. 12 is a view of the pole.
FIG. 13 is a view of the connector.
FIG. 14 is a cross-sectional view of the connector.

As shown in FIGS. 12 and 15, the multi-piece pole 800 includes pole sections 810 and 820. The pole sections 810 and 820 may be assembled together to form the multi-piece pole 800. The pole sections 810 and 820 may connect or attach to each other similarly to the other embodiments as described herein. Although two pole sections 810 and 820 are shown, additional pole sections, such as three, four, five, or more pole sections, may be utilized in construction of the multi-piece pole 800. The multi-piece assembly of the pole 800 provides a product with a reduced packaging size, which may be more convenient to ship, store, and retail. The multi-piece pole 800 is also easy for the retailer or consumer to assemble.

The pole sections 810 and 820 may be made from hollow, solid, and/or partially hollow metal or plastic tubing. Other materials indicated suitable for the other poles described herein may also be used. A hollow aluminum tube is suitable due to its strength, light weight, and corrosion resistance. The pole sections 810 and 820 may have an outer diameter of approximately 0.5 inches to approximately 2 inches. The pole 800 may have the dimensions, curvature, and shape described as suitable for the other poles described herein. When assembled, the pole 800 includes a curved shaped over the ground, i.e., a concave surface of the pole 800 faces the ground.

One or more connectors may be used to join or connect the pole sections 810 and 820. Each connecter includes a first end and a second end that fit or connect with the pole sections 810 and 820 in order to form the pole 800. Generally, the first and the second end of the connector is affixed or connected the pole sections 810 and 820. The first and the second end of the connectors may be crimped, screwed, glued, welded, fastened, or adhered to the pole sections 810 and 820 in order to assemble the pole 800. The first and second ends of the connectors may include insertable portions or male ends that are received by the pole sections 810 and 820. In other embodiments, the first or the second end of the connector may be permanently or nearly permanently affixed to one of the pole sections 810 or 820, while the other end is connected or attached to the other pole section by the consumer. In other embodiments, the connector may be integral with one of the pole sections 810 or 820.

A connector 840, shown in FIG. 13, is suitable for connecting the pole sections 810 and 820. The connector 840 includes a first end 850 and a second end 860. As shown in FIG. 18, the first end 850 of the connector 840 is inserted into a female end 812 of the pole section 810. Likewise, the second end 860 of the connector 840 is inserted into a female end 814 of the pole section 820. The female ends 812 and 814 are hollow or otherwise adapted to receive the first end 850 and the second end 860. The connector 840 may be molded from thermoplastics or cast from metal materials. The connector 840 may have a solid, hollow, or semi-hollow construction. In other embodiments, the connector 840 may be made from wood, composites, fiberglass, etc.

In the embodiment shown in FIGS. 10-27, the first end 850 and the second end 860 include a cylindrical shape that is inserted into the female end 812 and the female end 814. In other embodiments, the first end 850 and the second end 860 may include different shapes and designs, such as squared, ovular, rectangular, triangular, or other geometries that fit with female ends 812 and 814 having similar and complimentary shapes, designs and geometries to provide connection or attachment.

Screws or other fasteners pass through openings in the pole sections 810 and 820 and thread into the connector 840. During assembly by the user, the female end 812 of the pole section 810 receives the first end 850 of the connector 840, and the female end 814 of the pole section 820 receives the second end 860 of the connector 840. In other embodiments, the connector 840 may include open or female ends that receive an insertable or male end of the pole sections 810 and 820.

In the embodiment shown in FIG. 18, fastener 855 includes a threaded shaft 856 opposite a handle or gripping portion 857. The threaded shaft 856 is threaded through an opening 816 of the female end 812 and into a bore 852 of the first end 850 of the connector 840. On the opposite side of the connector 840, fasteners 862, such as the flush screws shown in FIG. 18, may be installed by a manufacturer, a retailer, or a consumer through openings 818 of the female end 814 and into bores 864 of the second end 860 to hold the second end 860 of the connector 840 in the female end 814 of the pole section 820.

The connector 840 includes a band 870 or wider region between the first end 850 and the second end 860 of the connector 840. The band 870 has an external diameter approximately larger than the internal diameter of the pole sections 810 and 820. As such, an end 817 of the pole section 810 and an end 827 of the pole section 820 may abut or be forced against the band section 870. Specifically, the ends 817 and 827 contact lateral portions 872 of the band 870.

Mounting members are used to hold the jersey flag 805 to the pole 800. The mounting members attach or tighten against the pole 800. In FIG. 16, the mounting members include rings 880 that slide over the pole 800. The rings 880 have an internal diameter larger than the external diameter of the pole 800. The rings 880 may be made from thermoplastics, elastomers, metals, and the like. The rings 880 may slide along the length of the pole 800 to be positioned on the pole 800 in order to properly and/or evenly position the jersey flag 805 on the pole 800. The rings 880 are tightened against the pole via fasteners, such as the threadable fasteners 882 shown in FIG. 16. The threadable fasteners 882 include a threaded shaft 883. The rings 880 include a threaded bore 884 to receive the threaded shaft 883 of the fasteners 882. The threaded shaft 883 of the fastener 882 extends through the threaded bore 884 (shown in FIG. 11) such that the threaded shaft 883 may pass through the rings 880 and tighten against a surface 802 of the pole 800. The fasteners 882 include handle or gripping portion 886 opposite of the threaded shaft 883. The size of the handle or gripping portion 886 is generally larger than a grommet or reinforced opening 807 of the jersey flag 805.

The jersey flag 805 includes the grommets or reinforced openings 807 that are positioned proximate to or over the rings 880. The grommets 807 may be made from metal, plastic, or other weather-resistant materials. The reinforced openings 807 may include openings in the material of the jersey flag 805 that have been reinforced with stitching and/or additional fabric. The grommets 807 may be used with other jersey flags described herein.

The threaded shaft 883 of the fastener 882 is inserted through the grommet or reinforced opening 807 and then tightened into the threaded bore 884 of the ring 880. The handle or the gripping portion 886 is larger in diameter than an opening of the grommet or reinforced opening 807. As such, the fastener 882 holds the jersey flag 805 to the pole 800. And, the combination of the fasteners 882 and the rings 880 position the jersey flag 805 on or to the pole 800.

In other embodiments, the mounting members may include clips or partial rings that include an opening to slip over the surface of the pole 800. The clips or partials rings may be fixed or closed onto the pole 800 via fasteners 882 or other fasteners.

The use of the combination of the rings 880 allows for different sized jerseys to fit onto the pole 800. The rings 880 will slide and tighten along the surface 802 of the pole 800. The positioning of the rings 880 is thus adjustable. Although the embodiment of FIGS. 10-27 uses two rings 880, additional embodiments may include additional rings 880. For example, two, three, four, five, or more rings 880 may be used with a single jersey flag 805.

A mounting bracket 900 is shown in FIGS. 20-23. A jersey hanger assembly 809 is formed from the mounting bracket 900 and the pole 800. The jersey hanger assembly 809 is shown mounted to the structure 1 in FIG. 12. The mounting bracket 900 positions the pole 800 at an angle of approximately 60° to approximately 65° relative to the horizontal. The mounting bracket 900 may be designed to position the pole at other angles, such as approximately 45° to approximately 80° relative to the horizontal. The mounting bracket 900 may be molded from nylon reinforced plastic. The mounting bracket 900 may also be constructed from other materials indicated suitable for the other mounting brackets described herein.

The pole 800 connects to the mounting bracket 900 similarly to other embodiments described herein. A pole end 825 of the pole section 820 is inserted into an opening 910 of a receiving member 920. The pole end 825 is oppositely disposed to the female end 814. The receiving member 920 is integral to and extends from a mounting portion 930.

The opening 910 leads into a cavity 925 of the receiving member 920. The pole end 825 has a diameter slightly less than the opening 910 and the cavity 925, such that the pole end 825 will fit or snugly fit into the cavity 925. The cavity 925 should have a sufficient depth to receive and cover at least several inches of the pole end 825 in order to provide stability to secure the pole 800 to the mounting bracket 900.

The mounting bracket 900 includes the mounting portion 930, which has generally flat base surface 935. The base surface 935 includes openings 940 therethrough that receive fasteners 945 to attach the mounting bracket 900 to a house, wall, pole, or other structure 1. The fasteners 945 may include nails, screws, bolts, rivets, and other known in the art fastener devices. In other embodiments, the openings 940 may be omitted and an epoxy or adhesive may be used to attach the mounting bracket 900 to the structure 1.

The receiving member 920 includes an optional opening 944. A holding member 950 is inserted into the opening 944 to further secure the pole end 825 into the cavity 925. The holding member 950 may include a screw or other fastener that is removably fastened into the opening 944, such as by threads internal to the opening 944. By installing the holding member 950, the pole 800 is further secured to the receiving member 920.

The pole end 825 may optionally receive an internal support piece 960, which assists in supporting the pole section 820. The internal support piece 960 fits within the internal diameter of the pole end 825. The internal support piece 960 may be glued, crimped, or pressed into the pole end 825.

The pole 800 forms an arc of approximately 30° to approximately 70°, with the pole 800 shown in FIG. 12 forming an arc of approximately 50°. The pole 800 may have a centerline radius of approximately 1000 mm to 2000 mm, however, the size may vary depending on the application or consumer preference.

Figure 24:
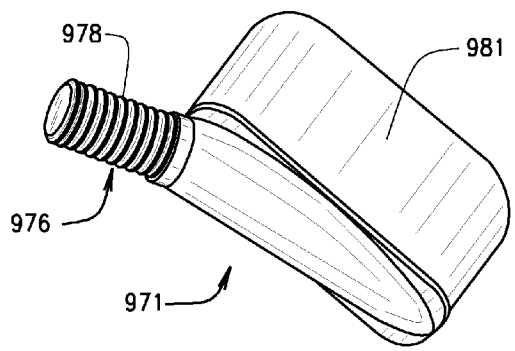
FIG. 24 is a view of one embodiment of the end cap.
Figure 25:
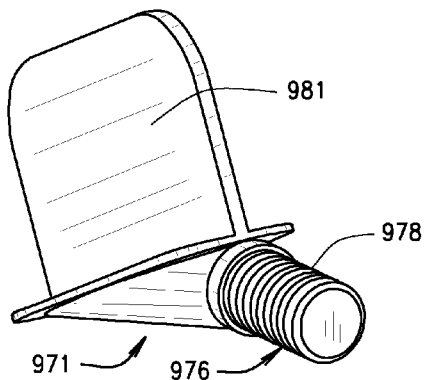
FIG. 25 is a view of one embodiment of the end cap.
Figure 26:
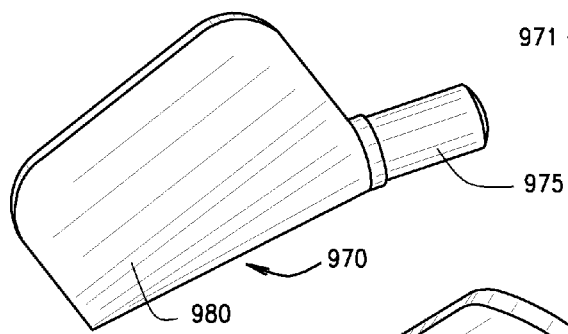
FIG. 26 is a view of another embodiment of the end cap.
Figure 27:
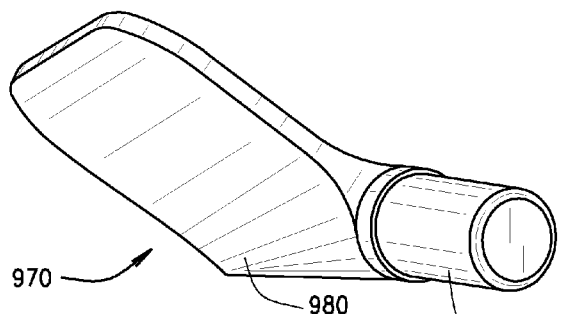
FIG. 27 is a view of another embodiment of the end cap.

An end cap 970 is attached or connected to an end 815 of the pole 800. The end 815 is opposite of the female end 817. The end cap 970 is shown in FIGS. 26 and 27. The end cap 970 includes an insertable portion 975 that inserted into the end 815 of the pole 800. The end cap 970 includes a flat portion 980 for additional branding, stickers and the like. Another end cap 971 is shown in FIGS. 24 and 25. The end cap 971 includes a flanged portion 976 that is inserted into the end 815. The end cap 971 includes a flat portion 981 for additional branding, stickers and the like.

A method of assembling a jersey display is also described herein. The method includes providing the first pole section 810, the second pole section 820, and the connector 840. The method includes attaching or connecting the first pole section 810 to the connector 840 and attaching or connecting the second pole section 820 to the connector 840. The method further includes providing a jersey 805. The method further includes inserting the end (815 or 825) of the pole 800 through the jersey 805.

Figure 28:
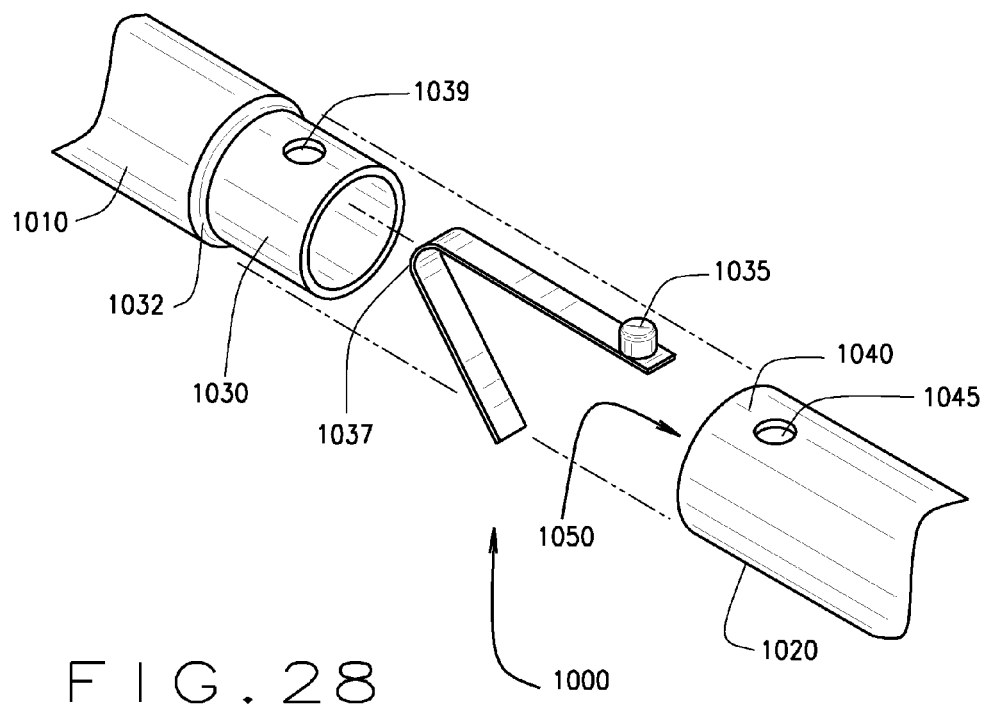
FIG. 28 is an exploded view of the multi-piece pole using male and female ends.
Figure 29:
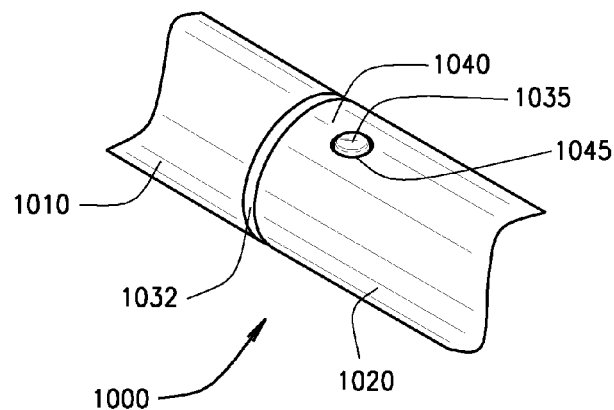
FIG. 29 is an assembled view of the multi-piece pole using male and female ends.

Another embodiment of the multi-piece pole is shown in FIGS. 28 and 29. A multi-piece pole 1000 includes pole sections 1010 and 1020. The pole sections 1010 and 1020 may be assembled together to form the multi-piece pole 1000. Although two pole sections 1010 and 1020 are shown, additional pole sections, such as three, four, five, or more pole sections, may be utilized in construction of the multi-piece pole 1000.

One of the ends of one of the pole sections forms a male end that is received by a female end of one of the other pole sections. Either the male end or the female end includes an extending member, such as a button or nub, which engages the other end. The extending member may be spring loaded or biased to an extended position. During assembly, the user retracts or pushes the extending member to a retracted position. Next, the male end is inserted into the female end with the extending member held in the retracted position. The extending member is aligned with a hole or opening in the other end and the extending member extends to engage the hole or opening. As such, the pole sections are locked together.

As shown in FIG. 28, the pole section 1010 includes a male end 1030, which includes an extending member 1035. The male end 1030 is inserted into a female end 1040 of the pole section 1020. The male end 1030 has a cylindrical shape with a smaller external diameter than an internal diameter of the female end 1040. In other embodiments, the male end 1030 and the female end 1040 may include different shapes and designs, such as squared, ovular, rectangular, triangular, or other geometries that fit with each other to provide connection or attachment between the pole sections 1010 and 1020.

The female end 1040 includes an entry opening 1050 that receive the male end 1030. The female end is 1040 is hollow or partially hollow in order to receive the male end 1030. The entry opening 1050 is larger than the male end 1030 to allow the male end 1030 to pass into the female end 1040.

The extending member 1035 extends and retracts into the male end 1030. The extending member 1035 is spring-biased by a spring 1037 to an extended position. The extending member 1035 protrudes through a hole or opening 1039 in the male end 1030. The extending member 1035 may be pressed or pushed by the user, overcoming the spring-biasing, in order to retract the extending member 1035 into the male end 1030.

When the extending member 1035 is retracted, the male end 1030 may be inserted or fit into the female end 1040. The female end 1040 includes an opening 1045 that receives the extending member 1035. The opening 1045 is in the exterior wall or structure forming the female end 1040. The male end 1030 may be rotated or twisted within the female end 1040 until the extending member 1035 is aligned with the opening 1045. When the extending member 1035 is aligned with the opening 1045, the extending member 1035 extends into the opening 1045 and locks the male end 1030 and the female end 1040 together.

The extending member 1035 may extend into the opening 1045 and/or pass through the opening 1045. The extending member 1035 extends from the male end 1030 in a direction generally perpendicular to the axis of the pole sections 1010 and 1020. In order to disassemble the pole 1000, the user presses on or pushes the extending member 1035 until it is retracted, and then pulls the pole sections 1010 and 1020 apart.

The male end 1030 includes the smaller external diameter that fits into the female end 1040. As shown in FIG. 28, the male end 1030 has a smaller external diameter than the remainder of the pole section 1010, i.e., the cross-sectional diameter of the pole section 1010 tapers at a tapered section 1032 to form the male end 1030. In other embodiment, the pole section 1010 may generally include a smaller overall diameter than the pole section 1020 such that the male end 1030 fits into the female end 1040 without a tapered section 1032 in the pole section 1010.

In other embodiments, the multi-piece pole 1000 may include three pole sections. A middle pole section may include male ends with extending members on both ends of the middle pole section. The two male ends receive female ends of the two outer pole sections. Alternatively, the middle pole section may include two female ends that receive male ends of the two outer pole sections.

The multi-piece pole 1000 may used with the bracket members, mounting members, rings 880, and/or other components and features described herein in order to hang or display the jersey flags described herein.

It should be understood from the foregoing that, while particular embodiments of the invention have been illustrated and described, various modifications can be made thereto without departing from the spirit and scope of the present invention. Therefore, it is not intended that the invention be limited by the specification; instead, the scope of the present invention is intended to be limited only by the appended claims.

What is claimed
1. A jersey display, comprising:
   a bracket member;
   the bracket member comprising a receiving member;
   a pole comprising two or more pole sections that are connected or attached together to form the pole;
   the pole with first and second ends;
   the second pole end insertable into the receiving member;
   the pole having a curved shape between the first and second ends;
   a jersey is hung or mounted to the pole; and,
   mounting members that comprise rings that slide over the pole, wherein the rings have an internal diameter larger than an external diameter of the pole, wherein the rings slide along the pole to position the jersey on the pole, and the rings are tightened against the pole via fasteners, wherein the fasteners comprise a threaded shaft, the rings comprise a threaded bore that receives the threaded shaft, and the threaded shaft of the fastener extends through the threaded bore such that a portion of the threaded shaft tightens against a surface of the pole, wherein the fasteners comprise a handle or gripping portion, wherein a size of the handle or gripping portion is larger than a grommet or a reinforced opening of the jersey, and wherein the threaded shaft of the fastener is inserted through the grommet or the reinforced opening and then tightened into the threaded bore of the ring, and the fastener holds the jersey to the pole.

2. The jersey display according to claim 1, wherein the pole passes through a sleeve formed between a first layer of jersey material and a second layer of jersey material.

3. The jersey display according to claim 1, wherein the mounting members attach or tighten against the pole, and the mounting members hold the jersey to the pole.

4. The jersey display to claim 1, wherein the pole passes through an opening defined by a first arm portion and a second arm portion of the jersey, and the curved shape of the pole faces downward.

5. A pole to display or hang a jersey, comprising:
   a pole comprising two or more pole sections;
   a connector to join the pole sections to form the pole;
   the pole with first and second ends, wherein the pole has a curved shape between the first and second ends; and,
   mounting members that attach or tighten against the pole to hold the jersey to the pole, wherein the mounting members comprise rings that slide over the pole, wherein the rings have an internal diameter larger than an external diameter of the pole, wherein the rings slide along the pole to position the jersey on the pole, and the rings are tightened against the pole via fasteners, wherein the fasteners comprise a threaded shaft, the rings comprise a threaded bore that receives the threaded shaft, and the threaded shaft of the fastener extends through the threaded bore such that a portion of the threaded shaft tightens against a surface of the pole, wherein the fasteners comprise a handle or gripping portion, wherein a size of the handle or gripping portion is larger than a grommet or a reinforced opening of the jersey, and wherein the threaded shaft of the fastener is inserted through the grommet or the reinforced opening and then tightened into the threaded bore of the ring, and the fastener holds the jersey to the pole.

6. The pole according to claim 5, wherein the pole forms an arc of approximately 30° to approximately 70°.

7. The pole according to claim 5, wherein the connector comprises a first end and a second end that fit or connect with the pole sections to form the pole.

8. The pole according to claim 7, wherein the first and second ends of the connector comprise insertable portions or male ends that are received by the pole sections.

9. The pole according to claim 7, wherein the first end of the connector is inserted into a female end of a first pole section, and the second end of the connector is inserted into a female end of a second pole section.

10. The pole according to claim 9, wherein the connector comprises a band or wider region between the first end and the second end of the connector, wherein the band or wider region has an external diameter approximately larger than an internal diameter of the pole sections, and an end of the first pole section and an end of the second pole section abut or are forced against the band or wider region.

11. The pole according to claim 10, wherein the end of the first pole section and the end of the second pole section contacts lateral portions of the band or wider region.

12. The pole according to claim 5, wherein additional fasteners pass through openings in the pole sections and thread into the connector.

13. The pole according to claim 5, wherein a first pole section comprises a male end, a second pole section comprises a female end, and an extending member connects the male end and the female end together, wherein the male end is inserted into the female end, and the extending member extends from the male end into a hole in the female end.

14. The pole according to claim 13, wherein the male end is inserted into the female end, the extending member is spring biased to extend from the male end and to retract into the male end, and the extending member extends from the male end into a hole in the female end.

15. A method of assembling a jersey display, comprising:
providing a first pole section, a second pole section, and a connector;
attaching or connecting the first pole section to the connector;
attaching or connecting the second pole section to the connector;
forming a pole, wherein the pole has a curved shape;
providing a jersey;
inserting an end of the pole through the jersey; and,
engaging the jersey to mounting members on the pole, wherein the mounting members comprise rings that slide over the pole, wherein the rings have an internal diameter larger than an external diameter of the pole, wherein the rings slide along the pole to position the jersey on the pole, and the rings are tightened against the pole via fasteners, wherein the fasteners comprise a threaded shaft, the rings comprise a threaded bore that receives the threaded shaft, and the threaded shaft of the fastener extends through the threaded bore such that a portion of the threaded shaft tightens against a surface of the pole, wherein the fasteners comprise a handle or gripping portion, wherein a size of the handle or gripping portion is larger than a grommet or a reinforced opening of the jersey, and wherein the threaded shaft of the fastener is inserted through the grommet or the reinforced opening and then tightened into the threaded bore of the ring, and the fastener holds the jersey to the pole.

16. The method according to claim 15, further comprising engaging the mounting members to the pole, and adjusting the position of the mounting members on the pole.

17. The method according to claim 15, further comprising inserting an end of the pole through an opening of the ring, sliding the ring on the pole, and fastening the jersey to the ring.

18. The method according to claim 15, further comprising inserting an end of the pole through an opening of the ring, sliding the ring on the pole, inserting a fastener through the jersey, and connecting the fastener to the ring.

19. The method according to claim 15, further comprising inserting an end of the pole through an opening of the ring, sliding the ring on the pole, inserting the fastener through the grommet or reinforced opening of the jersey, connecting the fastener to the ring to hold the jersey to the pole, and tightening the fastener against the pole.

20. A jersey flag for hanging on a jersey hanger, comprising:
a first layer of material or fabric cut or shaped to resemble an athletic jersey, wherein the first layer forms a front surface of the jersey flag;
a second layer of material or fabric cut or shaped to resemble an athletic jersey, wherein the second layer forms a rear surface of the jersey flag;
fasteners;
a sleeve or an open seam in an upper portion of the jersey flag to receive a pole, and the upper portion of the jersey flag further comprising grommets or reinforced openings to receive the fasteners, wherein a first portion of the fasteners pass through the grommets or reinforced openings to tighten to mounting members, and the fasteners include a second portion;
the jersey flag forming a first arm portion and a second arm portion; and,
the front surface, the rear surface, or both the front and rear surface of the jersey flag include a team name, team logo, or player's name, and, the first portion of the fasteners comprise a threaded shaft, wherein the second portion of the fasteners comprise a handle or gripping portion, wherein a size of the handle or gripping portion is larger than the grommet or the reinforced opening of the jersey, wherein the threaded shaft of the fastener is inserted through the grommet or the reinforced opening, and wherein a pole passes through the sleeve or open seam in the upper portion of the jersey flag.

* * * * *